Dec. 10, 1935.  A. LYSHOLM  2,023,965
HEAT TRANSFER
Filed May 28, 1931  2 Sheets-Sheet 1

Dec. 10, 1935.  A. LYSHOLM  2,023,965
HEAT TRANSFER
Filed May 28, 1931  2 Sheets-Sheet 2
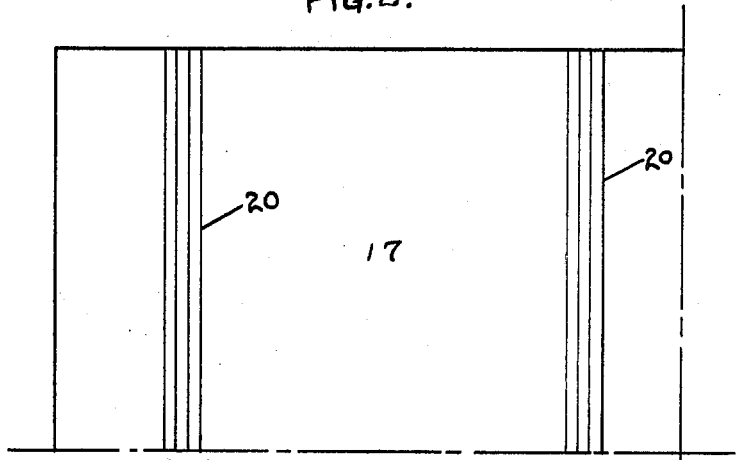
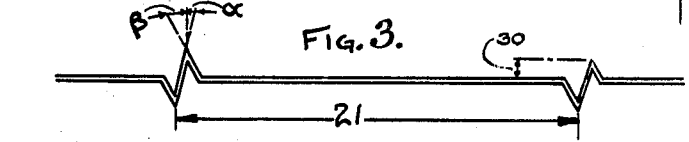
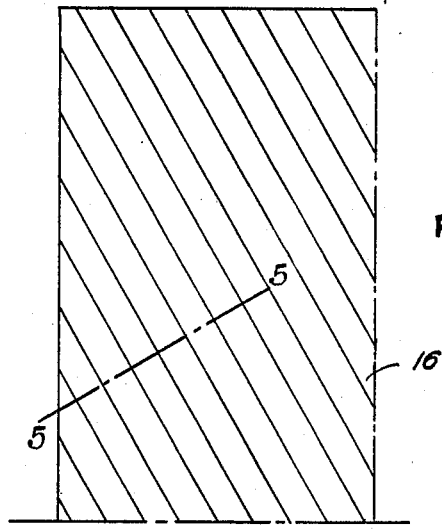

Patented Dec. 10, 1935

2,023,965

UNITED STATES PATENT OFFICE 2,023,965

HEAT TRANSFER

Alf Lysholm, Stockholm, Sweden, assignor to Aktiebolaget Ljungströms Ångturbin, Stockholm, Sweden, a joint-stock company of Sweden Application May 28, 1931, Serial No. 540,550
In Sweden May 21, 1930

12 Claims. (Cl. 257—6)

My invention relates to heat transfer and more particularly to plate structure for transfer of heat between fluids, and more particularly gaseous fluids such as the fresh air conducted to and the products of combustion conducted from a furnace.

The object of my invention is to provide more efficient heat transfer structure whereby a given quantity of heat can be transferred between fluid and metal with smaller volume occupied by metal and/or with less resistance than in prior structures.

Straight passage regenerative and recuperative heat exchange apparatuses are known. In the prior structures having straight passages there has not been sufficient heat transfer because of what might be termed layer formation of the fluid. If a fluid flows through a straight pipe which is hotter than the fluid, the pipe will heat what might be considered as a layer of the fluid adjacent the pipe, but conduction of heat through the fluid is relatively slow, and the fluid will pass through a pipe of reasonable length for heat transfer purposes without having the heat transmitted sufficiently to the inner portion or core of the fluid in the pipe. This has been recognized, and to overcome the difficulty turbulence has been employed. This turbulence has been especially highly developed in regenerative heat exchange apparatus. In earlier proposed structures, a honeycomb structure of bricks has been proposed. It will immediately be obvious that such a structure is impractical to clean. Cleaning is a vital factor in heat transmission apparatus, since in the majority of cases the heat conveying fluid contains material likely to deposit in the heat transfer apparatus. This is particularly true of products of combustion from a coal-burning furnace, and, for example, hot gas from a cement kiln. It will be clear that there are any number of pockets in a brick honeycomb structure which can be clogged by soot or other particles, and cakes of material can be formed in the heat transfer apparatus to such an extent as to render the apparatus useless after a relatively short period of operation.

Plate structures have been evolved in attempts to obtain cleanable structures with adequate heat transfer. One such structure consists of plates with corrugations extending obliquely to the line of flow of fluid, the corrugations of adjacent plates extending in oppositely oblique, and with the corrugated plates touching each other. Such a structure, instead of giving oblique flow, provides a continuous crossing of gaseous fluid from one channel to another. Thus the fluid acquires a high turbulent condition, and the heat transfer is good, but such structure has a very large pressure drop when dimensioned to give good heat transfer because of the production of violent turbulence, and, what is more serious, a multitude of irregular surfaces are provided to which soot and other impurities can readily adhere and cake. For the reason that gaseous fluid is given a highly turbulent action in such a structure, a stream of cleaning fluid is likewise given a highly turbulent action and cannot provide good cleaning effect. Subsequently, an alternating straight plate and corrugated plate structure was suggested with contacting plates providing straight passages in line with the general direction of flow of the gaseous fluid. This was in effect a reversion to the straight passage, and it was likewise found that if the dimensions were so small as to avoid differential temperature in the stream of gaseous fluid, a high resistance to flow was obtained. Such resistance is designated by the term pressure drop, which means the difference in pressure at the inlet and at the outlet of the heat transfer plate structure or mass.

To overcome this, it was later proposed to have larger spacing, but to prevent stratification by alternate expansion and contraction of the gaseous fluid. This provided some improvement, but the pressure drop was appreciable, due to the energy required to continually expand and contract the gaseous fluid.

The object of my invention is to improve structure of this general type, and I may briefly describe my improved structure by stating that I flow a large part of the fluid in an unobstructed straight path through the metal heat transfer mass at uniform pressure without abrupt change of direction of flow at the inlet to and the outlet from the mass, and flow a plurality of other parts of the fluid aggregating less in volume than such large part of the fluid, in contact with such large part of the fluid and angularly with respect thereto, and with material change of direction of flow at the inlet to and the outlet from the mass, to produce lateral movement in the unobstructed path due to molecular friction. By utilizing this principle, I obtain uniformity of cross-section of flow in the large free passage, and still obtain sufficient movement of the gaseous fluid in the unobstructed path of flow to avoid stratification, without the use of baffling, and I provide a structure which is not likely to collect impurities, and which can be easily cleaned.

My invention will be understood by reference to the following specification read in conjunction with the accompanying drawings forming a part of the specification and of which:

Fig. 2 is a side view of part of one plate of heat transfer structure in accordance with the invention;

Fig. 3 is an end view of the plate shown in Fig. 2;

Fig. 4 is a part of another form of plate forming a part of structure embodying the invention;

Fig. 5 is a cross sectional view of the plate shown in Fig. 4 and is taken on the line 5—5 of Fig. 4.

Figure 1:
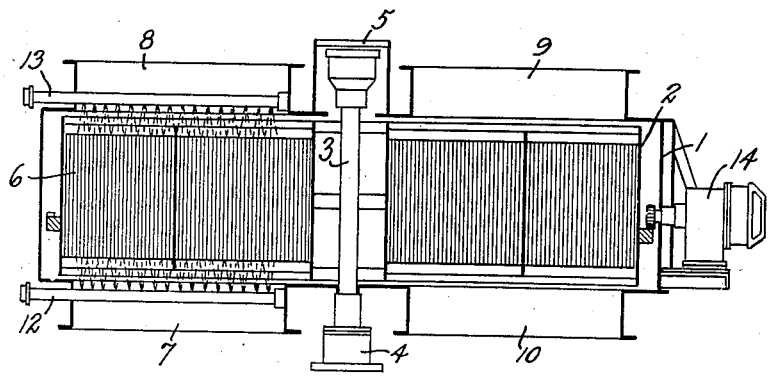
Fig. 1 is a sectional view through a heat exchanger of the regenerative type suitable for embodiment of the invention.

Fig. 1 is a vertical sectional view through a casing 1 which contains a rotor 2. This rotor, which is of cylindrical form and open at the top and bottom is mounted on a shaft 3. The shaft 3 is supported and guided by axial and thrust bearings 4 and radial bearings 5. The rotor is filled with the regenerative mass 6 which according to the invention consists of plates made up in a certain manner. The casing 1 is divided into two channels for the fluids, between which heat transfer shall take place. The rotor 2 rotates in such manner that the heat transferring mass alternately passes within the channel for the one and the channel for the other fluid. At 7 the casing is provided with an inlet and at 8 with an outlet for the heat delivering medium, and at 9 with an inlet and at 10 with an outlet for the heat absorbing medium. If the apparatus is used as an air preheater for boilers, the flue gases enter through the inlet opening 7 and are discharged through the outlet opening 8. The air to be preheated enters through the opening 9 and is discharged through the opening 10. These four openings are provided, as shown in the figure, with flanges, by means of which the preheater casing 1 can be connected to those conduits or pipes which are required for conducting the gaseous fluid to and from the different places of utilization. In order to free the plates of the regenerative mass from impurities, there are arranged two steam pipes 12 and 13 provided with holes, by means of which the impurities may periodically be blown away with steam jets, as disclosed in the figure. This removal of soot takes place, while the heat carrying rotor rotates. By these means all the plates become successively cleaned. The removal of soot from the air preheater or the cleaning of the heat transferring apparatus may thus be effected during running, while the rotor is driven by a separate motor 14 which by means of a pinion and a peripherally arranged cog-path drives the rotor with a speed of, for instance, 2–4 revolutions per minute. The rotor comprises radial walls extending between an outer shell of greater diameter and an interior shell of smaller diameter fixed to the shaft. These walls divide the rotor into a number of segments which, in turn, are divided into smaller chambers by means of walls arranged concentrically with the outer shell. In such chamber, plates are inserted at a certain distance from each other, so that channels are formed between the plates.

Figs. 2 to 6 show the preferred form of heat transfer structure embodying the invention. Inasmuch as the invention is specifically described with reference to a regenerative type heat transfer apparatus the heat transfer structure is herein, but without limitation, referred to as regenerative mass. The regenerative mass comprises a plurality of substantially flat plates 17, alternatively arranged with respect to what I term undulated plates 16. That is, between any two adjacent substantially flat plates 17 there is an undulated plate 16. Likewise, the undulated plates 16 are separated by the substantially flat plates 17. Both the substantially flat plates and the undulated plates are arranged in the general line of flow of gaseous fluid through the heat transfer apparatus. This general direction of flow is vertical in the device shown in Fig. 1, and any statements of direction hereinafter made are to be understood as with reference to Fig. 1, it being clear, however, that vertical flow is not essential.

Figure 6:
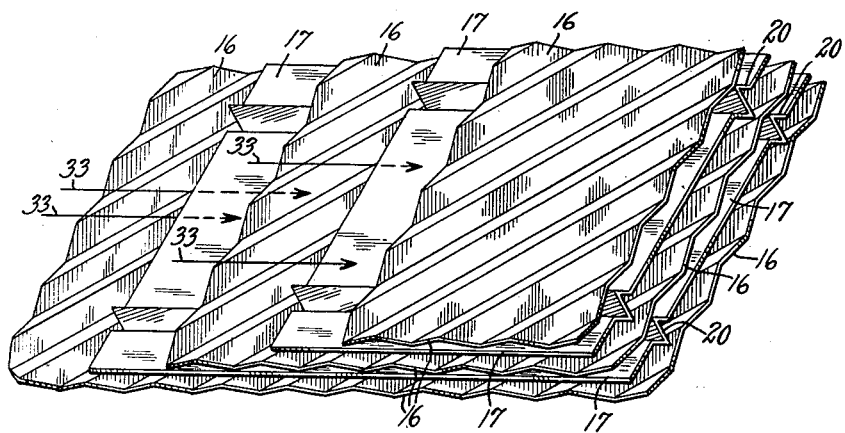
Fig. 6 is a perspective assembled view of plate structure embodying the invention.

The plates are generally rectangular as applied to the structure of Fig. 1, with vertical side edges and horizontal top and bottom edges. The plates 17 are formed with widely spaced vertical Z-shaped corrugations 20. These corrugations 20 act as spacers and as edge walls for fluid passage space between them. The corrugations may advantageously be of such form that the angle $\alpha$ is half the angle $\beta$. The angle $\alpha$ may, for example, be 15°. The corrugations 20 are spaced so far apart that there are flat areas of relatively large extent between them. As a dimensional example, the lateral extent of the corrugation 20 to either side of the general plane of plate 17 may be 3 to 6 millimeters, while the distance 21 between the corrugations may be 80 millimeters. The plate may be described as having widely spaced projections in the general line of flow providing furrows which are relatively wide and which are flat-bottomed, and which are relatively low in height compared to their width, although the height of these furrows is great compared to the height of furrows in adjacent plates, as will presently be brought out. The plates 16 are uniformly undulated as shown in Figs. 4, 5 and 6. The furrows formed by undulating these plates are uniform from end to end. The undulating is performed obliquely to the side edges of the plate. On the plate shown in Fig. 4, the furrows extend at an angle of 30° to the vertical, that is, 30° to the general line of flow of gaseous fluid. I have found that good results are obtained with this angle varying between 20° and 60° to the line of flow.

Fig. 5, which is a section through the plate 16 at right angles to the extension of the corrugations, shows the form of the undulated plate. The height of the undulation preferably is 1–3 millimeters, at the same time as the distance between the crests of the undulations is 14 millimeters. The undulations on the plates 16 thus have a height which at most is half and preferably may be less than a third of the height of the corrugations on the plate 17. For all forms of embodiment of plates here described ½ millimeter thick plates have been used, but of course other plate thicknesses may be used.

In Fig. 6 are shown plates according to Figs. 2 to 5, placed together adjacent each other in the way they are arranged in the chambers of the rotor. A Z-shaped corrugated plate 17 is thus bordered by two undulated plates 16. The direction of main flow of the gases is indicated by the arrows 33.

The function of my improved regenerative mass applied to the structure of Fig. 1 is as follows:

The hot fluid, for instance, hot products of combustion coming from a furnace, enters the apparatus at 7 and leaves at 8. It flows through the passages between the plates 16 and 17. The general line of flow is vertical. The corrugations 20 act as spacers, so that no parts of the flat portions of the plates 17 between the spacers 20 touch the crests of the undulated plates 16. Therefore, there is a free, unobstructed area of flow straight in the general direction of flow between plates 16 and 17 and between the corrugations or spacers 20. This is the passage space afforded by the furrows in the plates 17. We may consider that the spaces within the furrows of the undulated plates 16 are to one side of the free passage spaces formed by the furrows in plates 17. The furrows in the undulated plates 16 are, so to speak, V-bottomed in contrast to the flat-bottomed furrows of the plates 17, and it will be clear that the cross-sectional area of any furrow in the undulated plates is but a small fraction of the cross-sectional area of the furrows in the plates 17. The sum of the cross-sectional areas of furrows in the plates 16 adjacent to a furrow in a plate 17, is less than the cross-sectional area of the furrow in plate 17.

Some of the gaseous fluid passes along the furrows in plate 16. The fluid in the furrows of plate 16 is not free to flow in the general direction of flow, but is diverted due to the oblique disposition of the undulations, so that it must flow obliquely to the main line of flow. Whereas there is no abrupt change of gaseous fluid at the inlet to and the outlet from the furrows in the plate 17, the free flow of the fluid is obstructed in the furrows of plate 16, due to the oblique position. However, the flow in the furrows of both plates is entirely uniform. There is no expansion and contraction of the gaseous fluid. Thus, if we consider a complete passage as bounded by the spaces of the corrugations 20 and the bottoms of opposite furrows, the passage may be considered as divided into a large straight free unobstructed passage space and a plurality of smaller adjacent oblique passage spaces. It will be noted, however, that the cross sectional area of the complete passage in uniform. Due to the fact that the large passage spaces in the furrows of the plate 17 are in direct gas contact with the smaller oblique passage spaces to one side thereof, molecular friction causes lateral flow in the furrows of plate 17. Thus there is a lateral movement of gaseous fluid in the large unobstructed passage space outside the undulations of the plate 16 in the direction toward which the undulations are inclined with respect to the direction of flow. This lateral movement is, however, checked by the corrugations 20, and thus there is produced a lateral movement in the opposite direction adjacent the flat portions of the plate 17. Thus a controlled circulatory movement of gaseous fluid is produced in the unobstructed passage space. This gives what may be considered a modified turbulence while maintaining a constant cross-sectional area of flow and without the use of baffling, and no energy is lost by compression and expansion.

The hot fluid thus effectively heats the plates and the hot plates are slowly rotated as part of the rotor to the other side of the apparatus in the path of the fluid to be heated. The fluid to be heated, for instance, fresh air, enters at 9 and leaves at 10. Its passage through the plate structure is the same as that of the hot fluid. The heat is here given up to the fresh air, which passes to the furnace or other place of utilization.

On account of the great distance between the corrugations, there are fewer points of contact between the plates than in known embodiments. This reduces the number of places in which soot or other impurities are easily collected.

The greatest advantage with a regenerative mass according to the invention is that a given heat quantity can be transferred from a gas to the plate and vice versa, with a smaller plate surface and at the some time with less resistance than in hitherto known types.

The invention is not limited to apparatus of the type shown in Fig. 1, but may be applied to a great variety of heat transfer apparatuses.

What I claim is:—

1. In heat transfer apparatus including a casing provided with means to supply gaseous fluids thereto and means to withdraw the fluids therefrom and formed to provide a path of flow of fluid therein in a given general direction, a heat transfer plate structure comprising spaced substantially flat plates disposed in the direction of fluid flow, undulated plates between said substantially flat plates having uniform furrows, said undulated plates being disposed so that the furrows run obliquely to and at an appreciable angle to the given direction of flow, and said substantially flat plates having corrugations extending in said general direction of flow and spaced many times the width of the furrows in the undulated plates for separating the flat portions of the plates from the undulated plates, said furrows being open at the ends and said plates permitting ready access of fluid to the spaces between them, whereby straight unobstructed passage spaces are formed adjacent the substantially straight plates adapted for free flow of gaseous fluid in the general direction of flow and oblique flow takes place in the furrows in contact with the free flowing gaseous fluid and causes the free flowing gaseous fluid to move sideways in one direction adjacent the undulated plate and sideways in the opposite direction adjacent the substantially straight plate while maintaining constancy of cross-sectional area of flow.

2. In heat transfer apparatus including a casing provided with means to supply gaseous fluids thereto and means to withdraw the fluids therefrom and formed to provide a path of flow of fluid therein in a given general direction, a heat transfer plate structure comprising spaced substantially flat plates disposed in the direction of fluid flow, undulated plates between said substantially flat plates having uniform furrows, said undulated plates being disposed so that the furrows run obliquely to and at an appreciable angle to the given direction of flow, members extending in said general direction of flow and spaced many times the width of the furrows in the undulated plates for separating the flat portions of the plates from the undulated plates, said furrows being open at the ends and said plates permitting ready access of fluid to the spaces between them, whereby straight unobstructed passage spaces are formed adjacent the substantially straight plates adapted for free flow of gaseous fluid in the general direction of flow and oblique flow takes place in the furrows in contact with the free flowing gaseous fluid and causes the free flowing gaseous fluid to move sideways in one direction adjacent the undulated plate and sideways in the opposite direction adjacent the substantially straight plate while maintaining constancy of cross-sectional area of flow.

3. In heat transfer apparatus including a casing and provided with means to supply gaseous fluids thereto and means to withdraw the fluids therefrom and formed to provide a path of flow of fluid therein in a given direction, a heat transfer plate structure comprising spaced substantially flat plates disposed in the direction of fluid flow and having projections forming furrows of relatively great width to height, said furrows being flat-bottomed, plates between said substantially flat plates undulated to form V-bottomed furrows, said undulated plates being disposed so that the V-bottomed furrows run obliquely to and at an appreciable angle to the given direction of flow, said furrows being open at the ends and said plates permitting ready access of fluid to the spaces between them, the V-shaped furrows being of less height than the flat-bottomed furrows and many times narrower in width than the flat-bottomed furrows, whereby straight unobstructed passage spaces are formed adjacent the substantially flat plates adapted for free flow of gaseous fluid in the general direction of flow and oblique flow takes place in the V-bottomed furrows in contact with the gaseous fluid in the flat-bottomed furrows to give the gaseous fluid in the flat-bottomed furrows sidewise movement in one direction adjacent the undulated plates and sidewise movement in the opposite direction adjacent the substantially flat plates while maintaining constancy of cross-sectional area of flow.

4. In heat transfer apparatus including a casing provided with means to supply gaseous fluids thereto and means to withdraw the fluids therefrom and formed to provide flow of fluid therein in a given general direction, a heat transfer plate structure comprising an undulated plate having uniform furrows, said undulated plate being disposed in the general line of flow with the furrows extending obliquely to and at an appreciable angle to the given direction of flow and a plate section arranged generally parallel to and everywhere spaced from said undulated plate and extending transversely of the general direction of flow many times the width of the furrows, whereby a large straight free flow passage space is provided between the plate section and the crests of the furrows and movement of fluid in the furrows induces lateral movement in the free flow passage while providing substantially constant cross-sectional area of flow.

5. In heat transfer apparatus including a casing provided with means to supply gaseous fluids thereto and means to withdraw the fluids therefrom and formed to provide flow of fluid therein in a given general direction, a heat transfer plate structure comprising an undulated plate having uniform furrows, said undulated plate being disposed in the general line of flow with the furrows extending obliquely to and at an appreciable angle to the given direction of flow and a plate section arranged generally parallel to and everywhere spaced from said undulated plate and extending transversely of the general direction of flow many times the width of the furrows, whereby a large straight free flow passage space is provided between the plate section and the crests of the furrows and movement of fluid in the furrows induces lateral movement in the free flow passage while providing substantially constant cross-sectional area of flow, and means to reverse the sideways flow in the free flow passage space to produce circulatory movement therein.

6. In heat transfer apparatus including a casing provided with means to supply gaseous fluid thereto and means to withdraw the fluid therefrom and formed to provide flow of fluid therein in a given general direction, heat transfer mass comprising plates formed with shallow V-bottomed furrows and alternately disposed plates formed with flat-bottomed furrows several times as wide as the V-bottomed furrows, the furrows opening toward each other and being angularly disposed with respect to each other with the flat-bottomed furrows disposed longitudinally of said given general direction and with the V-bottomed furrows disposed obliquely with respect to said given general direction, the flat-bottomed furrows being materially deeper than the V-bottomed furrows.

7. In heat transfer apparatus including a frame work provided with means to supply gaseous fluid thereto and means to withdraw the fluid therefrom and formed to provide flow of fluid therein in a given general direction, a metal mass in said frame work comprising different kinds of plates placed alternately, one kind consisting of rectangular plates having furrows extending obliquely to the edges thereof, and the other kind consisting of rectangular plates substantially entirely flat and having spacers thereon extending parallel to the edges thereof and parallel to said given general direction, said spacers being spaced apart several times the width of said furrows.

8. In heat transfer apparatus including a frame work provided with means to supply gaseous fluid thereto and means to withdraw the fluid therefrom and formed to provide flow of fluid therein in a given general direction, a metal mass in said frame work comprising different kinds of plates placed alternately, one kind consisting of rectangular uniformly undulated plates having shallow furrows extending obliquely to the edges thereof and the other kind consisting of rectangular plates substantially entirely flat and having spacers thereon extending parallel to the edges thereof and parallel to said given general direction, said spacers being spaced apart several times the width of said furrows and having a height materially greater than the height of said furrows.

9. In heat transfer apparatus including a casing provided with means to supply gaseous fluid thereto and means to withdraw the fluid therefrom and formed to provide flow of fluid therein in a given general direction, a heat exchange plate structure comprising plates formed and spaced to provide an unobstructed straight path through the structure in said given general direction without abrupt change of direction of flow at the inlet to and the outlet from the plate structure and a plurality of oblique paths having cross sectional areas aggregating less than that of the straight path in open communication with the straight path at one side thereof and with material change in direction at the inlet to and the outlet from the plate structure.

10. In heat transfer apparatus including a casing provided with means to supply gaseous fluid thereto and means to withdraw the fluid therefrom and formed to provide flow of fluid therein in a given general direction, a heat exchange structure comprising plates of different kinds, one of said kinds consisting of plates formed with shallow furrows disposed obliquely with respect to said given general direction and the other kind consisting of substantially entirely flat plates formed with spaced parallel Z-shaped corrugations projecting from both sides of the plates, said corrugations being spaced apart several times the width of said furrows and being disposed parallel to said given general direction of flow, and said different kinds of plates being disposed alternately in said structure.

11. The method of heat transfer between fluid and solid which comprises flowing the major portion of the fluid in an unobstructed straight path through the solid at uniform pressure without material change of general direction of flow at the inlet to and the outlet from the solid, and flowing a plurality of other parts of the fluid aggregating a minor portion of the fluid in contact with said major portion of the fluid and angularly with respect thereto and with material change of direction of flow at the inlet to and the outlet from the solid to produce lateral movement of fluid in the unobstructed path due to molecular friction.

12. In heat transfer apparatus including heat exchange structure, means forming a part of said structure providing an unobstructed straight path for flow through said structure of fluid in a given general direction without material change of general direction of flow, and means providing a plurality of paths for flow of fluid in contact with the fluid in said straight path and oblique with respect to said general direction of flow, the last mentioned paths for oblique flow having an aggregate cross-sectional area less than the cross-sectional area of said straight path of flow, and the combined cross-sectional area of the straight path of flow and the oblique paths of flow in contact therewith being substantially constant from the inlet to the outlet of the heat exchange structure, whereby to provide for flow of fluid through the structure at substantially uniform pressure and with lateral movement of fluid in the unobstructed straight path due to molecular friction between such fluid and the fluid flowing in said oblique paths.

ALF LYSHOLM.